United States Patent
Sims

(10) Patent No.: US 7,044,401 B2
(45) Date of Patent: May 16, 2006

(54) INTEGRATED PEST PREVENTION SYSTEM

(75) Inventor: Gregory A. Sims, Las Vegas, NV (US)

(73) Assignee: Advanced Pest Control Systems, Inc., Sarasota, FL (US)

( * ) Notice: Subject to any disclaimer, the term of this patent is extended or adjusted under 35 U.S.C. 154(b) by 448 days.

(21) Appl. No.: 09/800,153

(22) Filed: Mar. 5, 2001

(65) Prior Publication Data

US 2002/0003172 A1    Jan. 10, 2002

Related U.S. Application Data

(60) Provisional application No. 60/217,220, filed on Jul. 10, 2000.

(51) Int. Cl.
 *B05B 15/10* (2006.01)

(52) U.S. Cl. ............ 239/208; 239/146; 239/282; 239/172

(58) Field of Classification Search ........... 239/282, 239/450, 536, 208, 146, 72, 74, 272, 172
See application file for complete search history.

(56) References Cited

U.S. PATENT DOCUMENTS

| | | | | |
|---|---|---|---|---|
| 2,246,731 A | * | 6/1941 | Hill | 43/124 |
| 2,842,892 A | | 7/1958 | Aldridge et al. | |
| 2,862,765 A | * | 12/1958 | Wing | 239/303 |
| 2,915,848 A | | 12/1959 | Griffin | |
| 2,981,025 A | * | 4/1961 | Woodson | 43/124 |
| 3,370,571 A | | 2/1968 | Knapp | |
| 3,676,949 A | | 7/1972 | Ramsey | |
| 3,782,026 A | | 1/1974 | Bridges et al. | |
| 4,028,841 A | * | 6/1977 | Lundwall | 43/124 |
| 4,210,286 A | | 7/1980 | Smitherman | |
| 4,742,641 A | * | 5/1988 | Cretti | 43/132.1 |
| 4,800,672 A | * | 1/1989 | Jackson | 43/125 |
| 4,893,434 A | | 1/1990 | Knipp et al. | |
| 4,917,296 A | * | 4/1990 | Konieczynski | 239/1 |
| 4,944,110 A | | 7/1990 | Sims | |
| 5,027,546 A | * | 7/1991 | Tallon | 43/124 |
| 5,310,114 A | * | 5/1994 | Cann | 239/74 |
| 5,347,749 A | | 9/1994 | Chitwood et al. | |
| 5,881,494 A | * | 3/1999 | Jenkins | 43/124 |
| 6,199,770 B1 | * | 3/2001 | King et al. | 239/208 |
| 6,463,694 B1 | * | 10/2002 | Manciet | 43/124 |

* cited by examiner

*Primary Examiner*—Christopher Kim
(74) *Attorney, Agent, or Firm*—Jacox Meckstroth & Jenkins

(57) ABSTRACT

A system is provided for distributing pesticide into the interior walls of a building includes an injection port in a wall of a building, connected to a manifold to which a large number of flexible tubing members, having discharge openings spaced along the length of the tubing members, are attached. The system may include a wheeled vehicle with separate vessels containing pesticide and inert gas under pressure connected to an injection gun. A flow meter is electrically connected to a data processor which records and prints information with respect to the amount of pesticide distributed into the wall.

In a preferred embodiment, a device which emits an audible signal is attached at downstream portions of the tubing members to enable service personnel inside the building to confirm that fluid is indeed passing through each of the tubing members.

15 Claims, 5 Drawing Sheets

INTEGRATED PEST PREVENTION SYSTEM

This application is a continuation-in-part of application Ser. No. 60/217,220, filed Jul. 10, 2000, entitled PESTICIDE DISPENSING SYSTEM

FIELD OF THE INVENTION

This invention relates to a built-in pest control system wherein pesticides can be distributed and released into the walls of a building by means of a pre-built distribution system. More particularly, it relates to a system for distributing pesticide into building walls through a single port in the wall which is connected to a downstream manifold which directs the pesticides into various portions of the building through a plurality of lines.

BACKGROUND OF THE INVENTION

There are many methods known for controlling pests, such as bugs, insects and rodents, by distributing pesticide throughout a building. Liquid pesticide is commonly sprayed along most baseboards and other exposed areas of a house or office building, both on the inside and outside of the building. The depositing and spraying of liquid or solid pesticides has certain inherent dangers. Hazardous materials may inadvertently be contacted by infants or pets, or possibly contaminate food supplies. Thus, the application of pesticides in a building can create a health hazard. In addition, despite efforts to spray liquid or aerosol pesticide into cracks and crevices in building walls and baseboards, the pesticide does not access the area in which most bugs and insects live, i.e., in the interstices of the walls.

In an effort to direct pesticide into areas commonly occupied by pests, numerous systems have been developed in which a distribution system is installed through the studs, joists, rafters, and built-ins of building during the construction phase. Examples of such systems are shown in Ramsey, U.S. Pat. No. 3,676,949 and Lundwall, U.S. Pat. No. 4,028,841.

An improved system for distributing pesticides throughout the walls of a building is set forth in my previous U.S. Pat. Nos. 4,944,110 and 5,231,796, the disclosures of which are incorporated herein by reference. These patents disclose a system in which lengths of flexible tubing having a plurality of spaced, tiny discharge orifices are distributed throughout the walls of a building during construction. Individual lengths of tubing are extended throughout every interior and exterior wall. Perforations in the tubing have conical discharge orifices, enabling rapid expansion of the pesticide as it exits the tube. Each of the tubes have an open end which terminates at a location on the exterior of the building. Thus, when a service person desired to inject pesticide into the tube, each tube would be serviced individually. First, pesticide would be injected into the tube, and then the line would be flushed or purged with a follow-up injection of nitrogen. Service personnel would then go through each line sequentially, first injecting pesticide, and then purging with nitrogen.

The necessity for injecting pesticides, and subsequent purging with nitrogen, through a large number of individual lines can cause a number of unforeseen problems. Depending on the size of the building, it may be necessary to conduct the injection/purging operation on a dozen, or perhaps many more, lines. Service technicians may skip one of the lines, or inadvertently inject one of the lines more than once, resulting in distribution of an excessive amount of pesticide in a single area. Furthermore, the opportunities of spilling of pesticide in the treatment of a large number of individual lines is increased. In addition, when individual lines are serviced with portable equipment, it is common not to use any measuring equipment to determine how much pesticide has been injected into a single port. Frequently, service personnel will simply estimate the amount of pesticide injected into a port by the amount of time the pesticide line has been connected to the port after the valve has been turned on. However, since the lines inside the house may vary significantly in length (depending upon how far away the line must travel before it gets to its desired wall location), measurement may be quite inaccurate.

In addition, in prior systems there was no way in which a service technician could determine whether or not the pesticide was actually reaching its intended destination within a building. If the interior lines had become crimped or plugged, there was no way for the technician to know that flow had become restricted.

In accordance with the present invention, sources of pesticide and compressed air or nitrogen are mounted on a vehicle. The vehicle may be a truck or a smaller cart which may be wheeled closer to the injection port in an exterior wall of the house. Separate lines for pesticide and compressed air extend from the sources to an injector gun. Valving associated with the injector gun permits selective injection of pesticide or purge gas. A flow meter and pressure gauge may be included on each line. If desired, a single line to the gun can be used, with pesticide and compressed air traversing the same line.

The injector gun mates with a single aperture in a manifold which is accessible from the exterior of the building. The manifold, which is located inside the exterior wall, has a plurality of nipples to which the flexible hoses which extend throughout the building are connected. To service the system, a technician attaches the gun to the manifold opening, and fills the manifold and lines with liquid pesticide while monitoring the pressure and flow meters. When the lines are filled to the desired degree, the valving is switched to permit purging of the lines with inert gas. The entire operation can be done without removing the injector gun from a single connection on the exterior of the house.

In a preferred embodiment, a computerized record of the servicing transactions is maintained on the vehicle. At the end of the service call, a computer will print out relevant information for the service call, such as the date and time of service, name of service technician, and quantity of pesticide distributed. The computer can also print out a billing for the service call which can be left at the building when the service has been completed.

In another embodiment of the invention, a coupling for lengths of distribution tubing is provided which creates an audible sound when a gas passes through the coupling. Preferably, the audible sound is that of a high-pitched whistle which is easily heard through a wall of the building. A technician can test the operability of the lines extending throughout the walls by attaching a source of compressed air to the single exterior port, and moving from room to room throughout the house to determine if the sound is heard in all of the rooms. If necessary, a listening device, such as a stethoscope, can be used to hear the noise emitted at the coupler.

BRIEF SUMMARY OF THE INVENTION

A system is provided for distributing pesticide into the interior walls of a building. An injection port is mounted in a wall of a building, preferably an exterior wall, where it can be accessed by service personnel. The system includes, in a preferred embodiment, a wheeled vehicle on which are mounted separately vessels containing pesticide and inert gas under pressure. Conduits connect the vessels to an injection gun, which has a valve permitting selective injection of pesticide or inert gas. A flow meter measures the amount of fluid passing through the injector gun. The flow meter is electrically connected to a data processor mounted on the vehicle. The data processor records, and a printer associated therewith prints out, information with respect to the amount of pesticide distributed into the wall.

Downstream of the injection port is a manifold to which a large number of flexible tubing members, having discharge openings spaced along the length of the tubing members, are attached. In a preferred embodiment, a device which emits an audible signal is attached at downstream portions of the tubing members to enable service personnel inside the building to confirm that fluid is indeed passing through each of the tubing members.

BRIEF DESCRIPTION OF THE DRAWINGS

The invention is best illustrated with respect to the drawings, in which.

DETAILED DESCRIPTION OF PREFERRED EMBODIMENTS

In the preferred embodiment of the invention, pesticide is injected into a single port located in an exterior wall of the building. The port communicates with a manifold from which a plurality of flexible distribution tubings exit to various locations within the building. Because a substantial quantity of pesticide is injected into the entire system at the same time through the port, a single fluid injection device or gun is used for both the liquid pesticide and the purging air.

Figure 1:
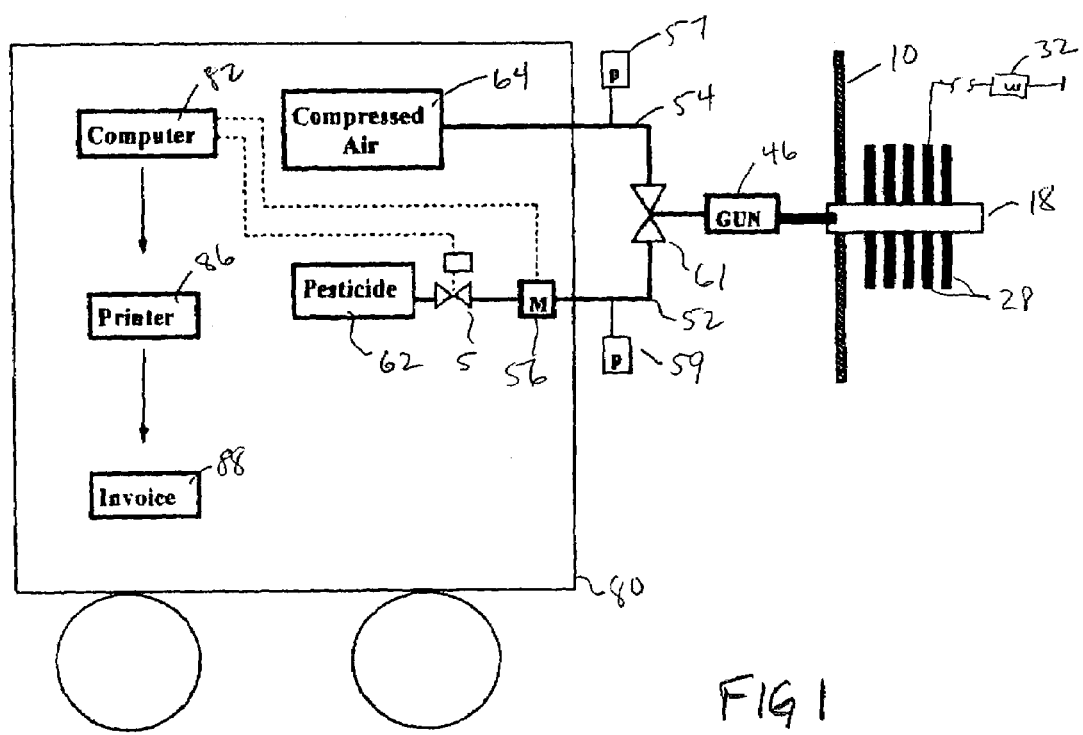
FIG. 1 is a schematic block diagram of an embodiment of the invention.
Figure 2:
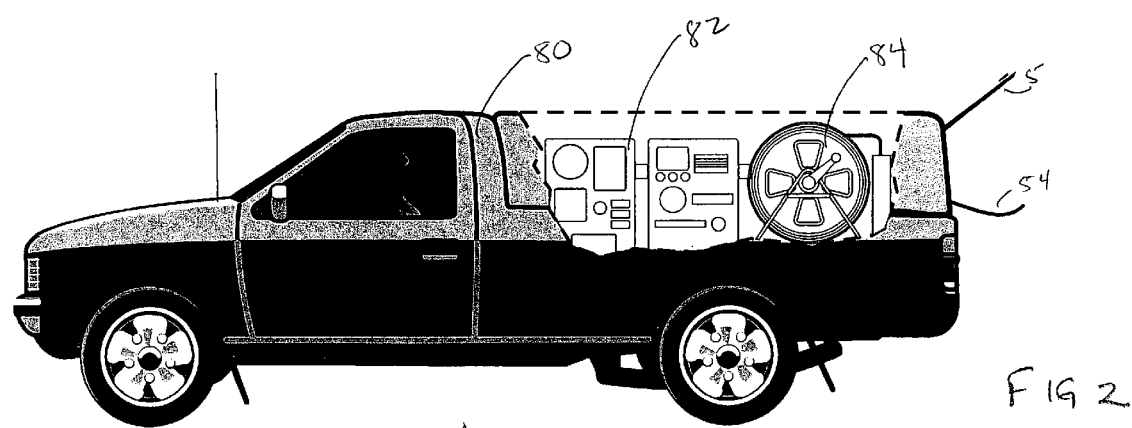
FIG. 2 is a side view of a vehicle partially cut away to show a computer which will effect the monitoring and billing portion of the invention.

In another preferred embodiment of the invention, as shown schematically in FIG. 1 and in a drawing in FIG. 2, the sources of pesticide and inert gas, such as compressed air (or nitrogen), are mounted on a wheeled vehicle. This vehicle can be a truck, of the type shown in FIG. 2, or a smaller wheeled vehicle which can be pulled by hand to the building in the location of the injection port 9.

Referring first to FIGS. 1 and 2, sources of pesticide 62 and compressed air 64 are mounted on truck 80. The pesticide is maintained under pressure (which may be supplied by the compressed air), or is fed by means of a demand pump (not shown) through valve 5, flow meter 56 and line 52, which exits the truck. The source of compressed air 64, which exits the truck through line 54, is generally a tank of compressed air which may also be connected to a compressor to maintain the pressure at the desired level. Pressure in the tank is usually maintained at at least 200 psig.

The computer 82 is also located on the truck. The computer obtains information from flow meter 56 to record the quantity of pesticides actually provided to the building. At the end of the service call, the technician can print out from the computer stored information including the date, time of day of the service call, quantity of pesticide disbursed, and the name of the technician. If desirable, the technician can input any other information which he believes may be helpful to the company or the customer. Thereafter, a complete statement and billing 88 can be printed out by printer 86, and left at the building for collection for later payment. By means of this system, billings can be delivered at an earlier date and with a higher probability of payment than previous systems.

Pressure gauges 57, 59 are generally located in the vicinity of the gun so that the technician can confirm that adequate pressures of pesticide and purging gas are being delivered to the site. If the sources of pesticide and compressed air are on a hand cart, then the pressure gauges can be located on the cart. In the event that the pesticide and compressed air sources are located on a truck which may be parked a distance from the injection port 9, the pressure gauges can be mounted immediately upstream of the injection gun. Flow meters such as the Green Garde® flow meter (which has a digital readout of flow rate and volume) can also be installed just upstream of the gun.

Figure 3:
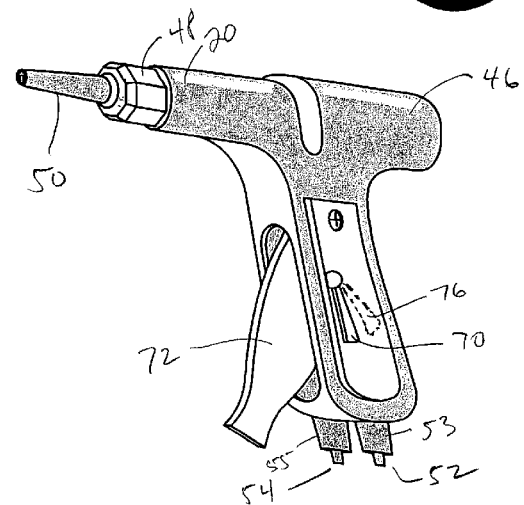
FIG. 3 is a perspective view of a service gun used in connection with the invention.

The service gun is best seen in FIG. 3. The gun 46 has a nozzle 50 having a threaded base 48 which is attached to the forward portion of the barrel 20 of the service gun. Any type of gun having the physical ability to distribute the pesticide and compressed air would be suitable for use in the invention. Example of a suitable service gun is the Green Garde® high pressure spray gun model JD9.

The service gun has two inlet ports 53, 55 to which lines 52 and 54 are connected. The gun has a valve 61 (see FIG. 1) having a valve handle or control level 70 for switching the gun feed between pesticide and purge gas. As shown in FIG. 3, the valve lever 70 can move between the position shown in FIG. 3, to permit the passage of compressed air, to the position 76 shown in phantom, which would permit the flow of pesticide through the gun.

Actuation of the service gun is effected by squeezing the spring-loaded, pivotally-mounted trigger 72 to enable liquid or gas to flow through the gun.

Figure 6:
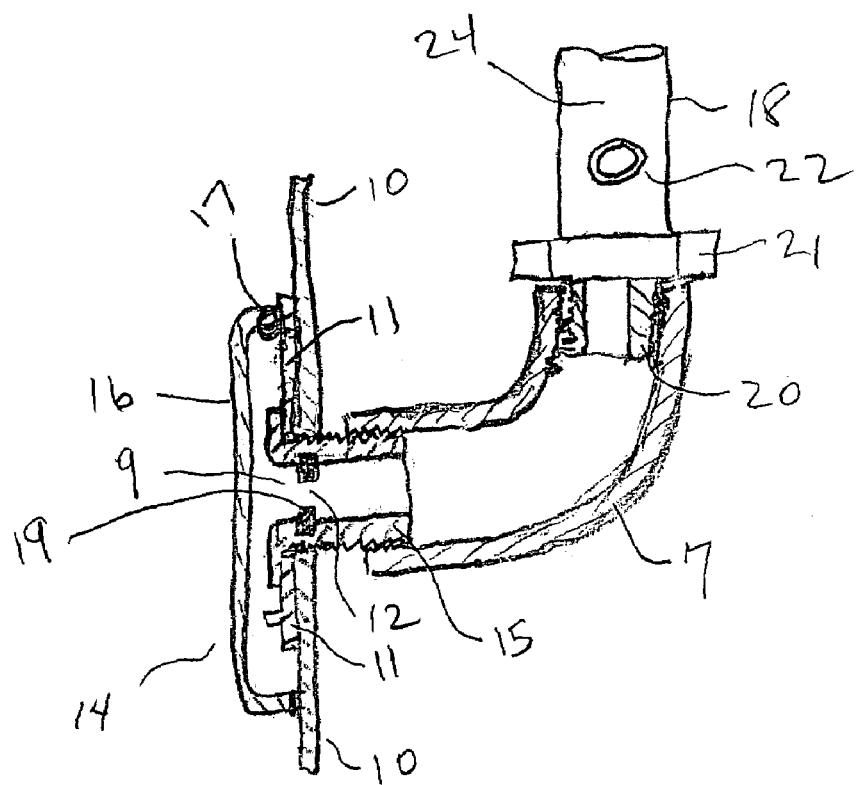
FIG. 6 shows a cutaway view of the wall port/manifold assembly.

Materials are injected into the outside of the building through the box fitting shown in FIG. 6. The fitting is mounted on the exterior of the building wall 10. A service box 14 is mounted on exterior wall 10 by means of a mounting panel 11, attached by screws (not shown). The service box has a hinged cover 16, mounted on hinge pin 17, enabling the lid to be lifted to expose the service port 9.

A threaded nipple 15 is mounted in the service box and extends into the interior of the building walls. A grommet or O-ring 19 is mounted on the interior of the nipple to engage the nozzle 50 of the service gun. The grommet is preferably made from a somewhat flexible material, such as rubber or thermoplastic material, in order to provide a seal with the nozzle in order to prevent leakage.

Figure 4:
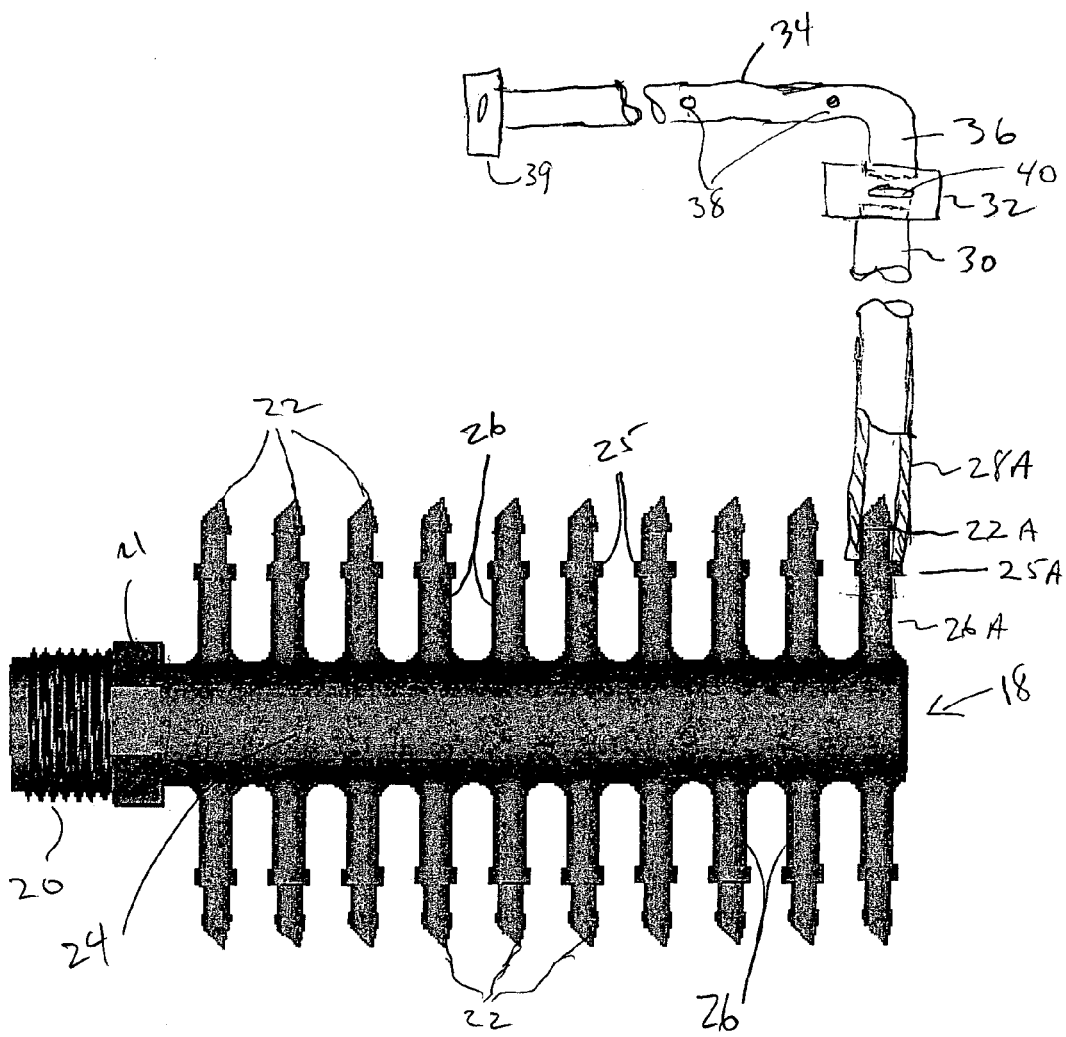
FIG. 4 is a plan view of a manifold used to distribute pesticide to various portions of the building.

The service assembly shown in FIGS. 4 and 6 are preferably mounted in the building at the time of original construction. Downstream of the nipple 15, all of the remaining components are located between the exterior and interior walls of the building in the building framing. A 90° PVC coupler, or elbow, is threadedly mounted on nipple 15. The other end of the nipple is connected to the threaded port 20 of distribution manifold 18, best seen in FIG. 4. The manifold has a wrench-receiving ring 21 to enable easy connection of the manifold to the elbow. The manifold 18 is mounted vertically in the wall space, and comprises a body portion 24 having an internal cylindrical conduit and a closed end. A plurality of nipples 26 extend perpendicularly from the body of the manifold to direct fluid entering the manifold through flexible conduits or tubes attached to the nipples to various portions of the building. Laterally expanded ends 22 of the nipples frictionally engage the flexible tubing members.

An example of the tubing attachment is shown on FIG. 4 at manifold coupling nipple 26A. The tubing 28A slidably engages the end 22A of nipple 26A. The tubing end abuts a circular stop rib 25A. Each nipple has stop ribs 25 located immediately downstream of the manifold body.

The flexible tubing lines, such as 28A, attached to the nipple are non-perforated and contain the fluid until it reaches the portion of the building where distribution into the wall is desired. As shown in FIG. 4, the downstream 30 of the feed line is connected to a dispensing line 34 by means of a coupler 32 shown at the far end 30 of the feed line. In a preferred embodiment, the coupler is equipped with a whistle mechanism 40, of conventional design, which emits a high-pitched, audible signal when compressed air passes through the coupler at high speed.

Figure 5:
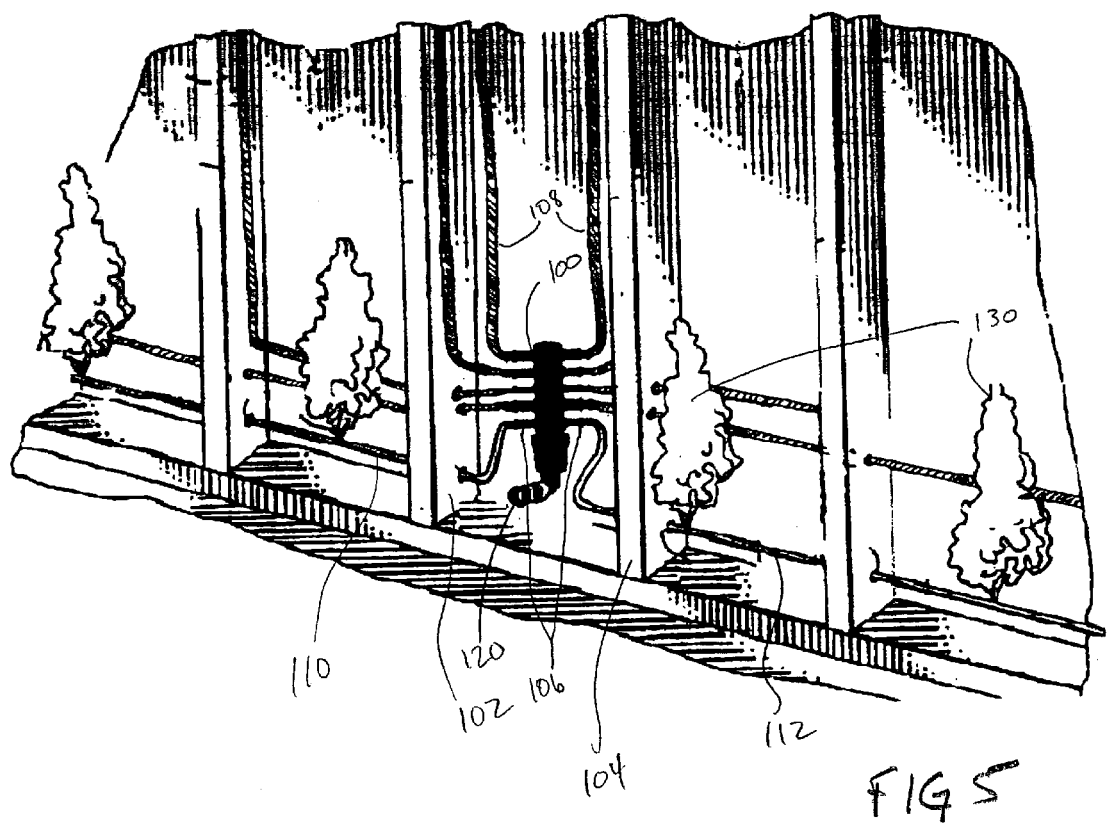
FIG. 5 shows distribution of the pesticide from a manifold within the building.

The coupler 40 connects the feed or connector line 28A with a dispensing tube 34. The upstream end 36 of tube 34 is inserted into the connector, and is either held by friction or an adhesive. The dispensing line 34 has a series of small openings or perforations 38, spaced approximately every 12 inches, thus ensuring that each space between wall studs will have at least one perforation 38 in lines threaded through the studs as shown in FIG. 5. While perforation spacing can be altered to fit the design of any building, 12 inch spacings are generally acceptable. The end of each dispensing line 34 may be closed, or may have a whistle, shown in FIG. 4 in end plug 39.

Upon completion of construction, all of the outlet tubes 22 of the manifold 18 are either connected to feed lines 28A which extend into the building, or are capped off. The length of the feed lines will vary depending on the location of the building to which pesticide will be delivered. The feed line, which has no perforation, will carry the materials through portions of the building in which no spray of pesticide is desired from that particular line. When the feed line reaches the target zone, the dispensing line 34 is connected through a coupler and placed throughout the studs, as shown in FIG. 5, in the target zone. Thus, the feed lines 28A and dispensing lines 34 will be of varying length dictated by the specific needs for each line.

The manifold 18 is generally made from molded plastic, and may be of any size necessary for a specific building. In addition, the number of outlet tubes to the manifold may vary, being at least two and up to thirty or more. Preferably, there are at least four, more preferably at least six or eight outlets. The manifold 18 shown in FIG. 4 has a ¾ inch body, with ¼ inch outlet tubes 22, 22A designed to accept ¼ inch tubing. While more than one manifold can be mounted in a building wall, the ratio of outlets to meet ports should remain as set forth herein.

The whistle couplers 40 are used to detect flow through the perforated tubing in each area of the building. After construction, when the walls enclose the tubing, there is no way for a technician to know if pesticide will reach all areas of the building where tubing has been placed. Whistles are placed in couplers and/or end caps of the distribution tubing, and make an audible sound when air is passed through the system. By attaching compressed air to the inlet port, the technician may go from room to room and listen, with the aid of a stethoscope, to ensure that pesticide will reach its desired destination. If a whistle is unable to be heard, then the line may be kinked or plugged, thus indicating that maintenance is necessary.

In use, the technician parks the truck 80 as close as possible to the portion of the building where the injection port 9 is located. If the injection materials are mounted on a wheeled cart, the technician brings the cart into the vicinity of the injection port 9. The computer 82 on the truck 80 is activated, as is the air compressor and, if applicable, the demand pump for the pesticide. Next, the cover on the injection box is raised, exposing the injection port 9.

The nozzle 50 of service gun 46 is then placed into the injection port 9, until a seal is obtained between the nozzle 50 and the O-ring 19 in the injection port. If desired, at this point, the technician may wish to test the lines for integrity, blowing compressed air through the system and going room to room to listen to ensure that air is reaching the desired portions of the building.

Next, the valve handle 70 is set to a position to enable liquid pesticide to flow into the system, and the grip on the service gun is squeezed to allow liquid to pass into the system. When sufficient pesticide has been fed to the system to fill it entirely with liquid (which can be monitored by the pressure gauges 59 and associated flow meters), the valve handle 70 is then switched to the compressed air setting. When the trigger 72 is squeezed, compressed air blows the liquid out through the perforations, creating a mist in a manner similar to a high-pressure water misting system. Activation of the system is depicted in FIG. 5.

The schematic representation of a system according to the invention mounted in the wall of a building is shown in FIG. 5. A manifold 100 is shown mounted in the wall space between the vertical studs 102 and 104. The manifold has ten connecting nipples 106 from which ten tubing lines extend. The top eight lines are non-perforated feeder lines 108 which extend into various parts of the building of which pesticide treatment is desired. The bottom two lines 110, 112 extend in the close vicinity of the manifold, and are perforated to enable discharge of the pesticide when purge gas is attached to port 120.

A schematic representation of a system according to the invention mounted in the wall of a building is shown in FIG. 5. A manifold 100 is shown mounted in the wall space between vertical studs 102, 104. The manifold has ten connecting nipples 106 from which ten tubing lines extend. The top eight lines are non-perforated feeder lines 108 which extend into various parts of the building for which pesticide treatment is desired. The bottom two lines 110, 112 extend in the close vicinity of the manifold, and are perforated to enable discharge of the pesticide when purged gas is attached to port 120. Pesticide exits the perforations in a cloud of mist shown for example at 130.

The invention claimed is:

1. A system for distributing pesticide into interior walls of a building comprising
   a port mounted in an exterior wall of the building;
   a fluid injection device comprising a gas inlet, a pesticide inlet, a discharge portion and valve means for selectively providing inert gas and pesticide to said discharge portion; said port being adapted to receive said discharge portion;
   a distribution manifold connected downstream of said port having an inlet portion and a plurality of outlets, wherein said plurality of outlets are nipples adapted to receive end portions of a plurality of elongate tubing members; and said plurality of elongate tubing members connected to said nipples, each of said plurality of elongate tubing member extending through at least one of said interior walls of the building and having fluid discharge openings spaced along said tubing members.

2. The system of claim 1 wherein the manifold has at least four outlets.

3. The system of claim 1 wherein the manifold has at least six outlets.

4. The system of claim 1 wherein the manifold has at least eight outlets.

5. The system of claim 1 wherein only one single port is mounted in the exterior wall of the building.

6. The system of claim 1 wherein the discharge portion of the fluid injection device is adapted to sealably mount to the port.

7. The system of claim 1 also including a wheeled vehicle, a source of pressurized inert gas and a source of pesticide separately mounted on the vehicle, and conduits from the sources to the fluid injection device for providing pressurized inert gas and pesticide to said device.

8. The system of claim 1 also comprises flow-measuring means for determining the amount of pesticide distributed into the building, and recording means for providing a printed record of the amount of pesticide distributed into the building.

9. The system of claim 8 wherein the recording means is mounted on the vehicle.

10. The system of claim 1 wherein the tubing members also include audible signal means for producing an audible signal when inert gas flows through the tubing members.

11. A system for distributing pesticide into interior walls of a building comprising a port mounted in an exterior wall of the building;

a fluid injection device having a discharge portion, said port being adapted to receive said discharge portion of a fluid injection device;

a distribution manifold connected downstream of the port having an inlet portion and a plurality of outlets, wherein the plurality of outlets comprise nipples adapted to receive end portions of a plurality of elongate tubing members, said plurality of elongate tubing members connected to said nipples, each tubing member extending through at least one wall of the building and having fluid discharge openings spaced along said tubing members, and flow measuring means for determining an amount of pesticide distributed into the building, and recording means for providing a printed record of the amount of pesticide distributed into the building.

12. The system of claim 11 wherein the injection device includes an inert gas inlet, a pesticide inlet, and valve means for selectively providing inert gas and pesticide to the discharge portion.

13. The system of claim 11 also including a wheeled vehicle, a source of pressurized inert gas and a source of pesticide separately mounted on the vehicle, and conduits from the sources to the fluid injection device for providing pressurized inert gas and pesticide to said device.

14. The system of claim 11 wherein the recording means is mounted on the vehicle.

15. The system of claim 11 wherein the tubing members also include audible signal means for producing an audible signal when inert gas flows through the tubing members.

* * * * *